March 30, 1926. 1,578,926
G. A. SHIELDS
GLASS MAKING MACHINE
Filed Feb. 19, 1923 2 Sheets-Sheet 1

Inventor
George A. Shields
By C. C. Shepherd.
Attorney

March 30, 1926.
G. A. SHIELDS
GLASS MAKING MACHINE
Filed Feb. 19, 1923    2 Sheets-Sheet 2
1,578,926
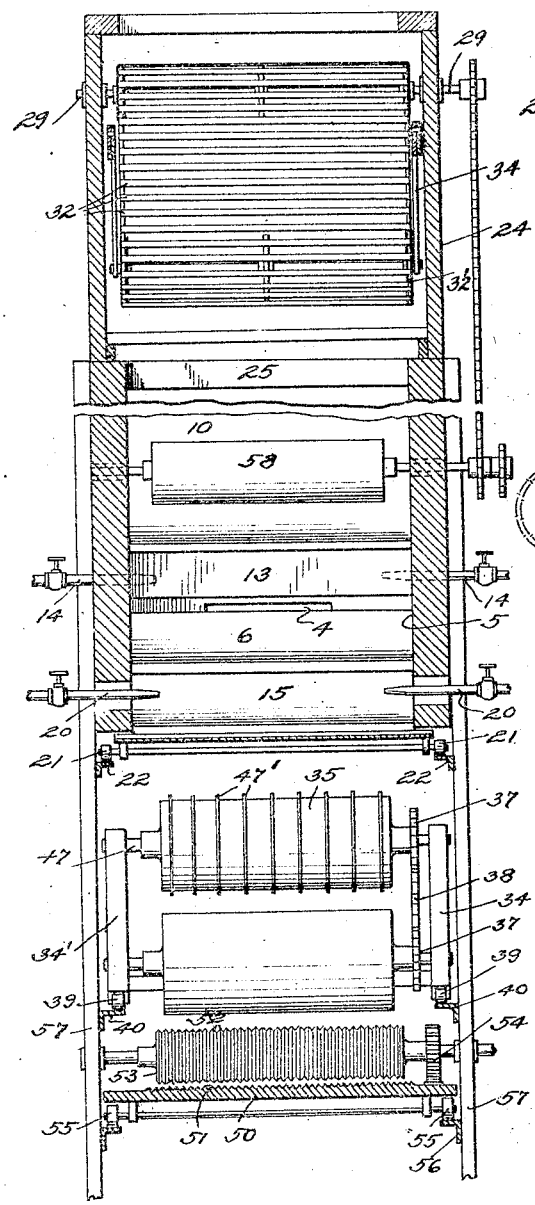
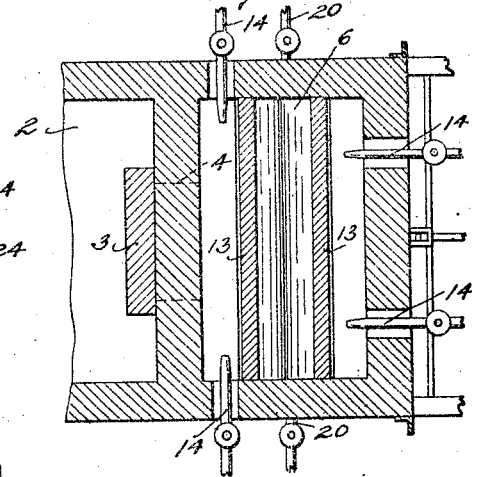
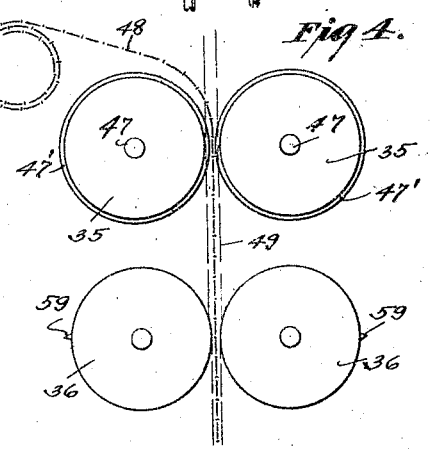
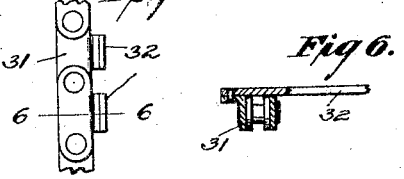
Inventor
George A. Shields
By C. C. Shepherd
Attorney Patented Mar. 30, 1926.

1,578,926

UNITED STATES PATENT OFFICE.

GEORGE A. SHIELDS, OF COLUMBUS, OHIO.

GLASS-MAKING MACHINE.

Application filed February 19, 1923. Serial No. 619,916.

*To all whom it may concern:*

Be it known that I, GEORGE A. SHIELDS, a citizen of the United States, residing at Columbus, in the county of Franklin and State of Ohio, have invented certain new and useful Improvements in Glass-Making Machines, of which the following is a specification.

The present invention is directed to improvements in machines for making sheet glass, and has for its primary object to produce a machine of this character constructed in such manner that sheet glass, such as window glass can be produced in an extremely simple and practical manner.

A further object of the invention is to provide a machine so constructed that the trough for receiving the molten glass can be separated to permit the molten glass therein to gravitate to a plurality of selectively adjustable rollers for forming sheets of glass of various classes, such as Florentine, wire, factory and corrugated glass.

A still further object of the invention is to provide novel means of elevating the sheets from high grade window glass after the same has been drawn.

With these and other objects in view, as will appear as the description proceeds, the invention consists in the novel features of construction, combinations of elements, and arrangements of parts, and hereinafter to be fully described and pointed out in the appended claims.

In the accompanying drawings:

Figure 2 is a sectional view taken at right angles to Figure 1,

Figure 3 is a sectional view on line 3—3 of Figure 1,

Figure 4 is a diagrammatic view of the lower set of rollers, showing the same used for making wire glass or corrugated glass, Figure 5 is a fragmentary side view of the elevator chain, an Figure 6 is a sectional view on line 6—6 of Figure 5.

Figure 1:
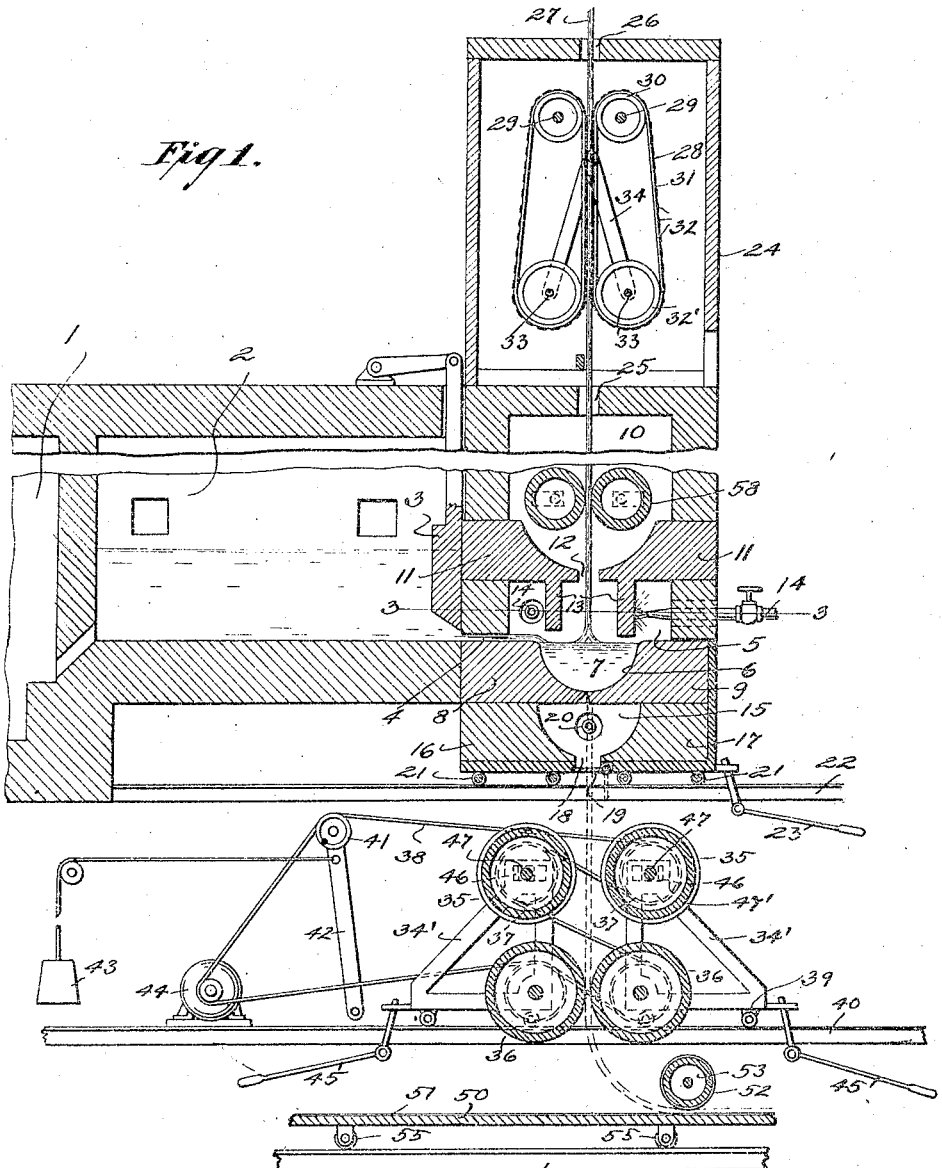
Figure 1 is a diagrammatic sectional view through the machine.

Referring to the drawings 1 designates the melting chamber, and 2 the communicating refining chamber, in the latter there being mounted a vertically adjustable gate 3 to cut off or regulate the flow of molten glass through the passage 4 to the flow chamber 5. The lower end of the chamber 5 is closed by a trough 6 for containing the molten glass 7, said trough including sections 8 and 9, and constitutes a bottom for said chamber.

Arranged above the chamber 5 is the drawing chamber 10 defined by the abutments 11 which are spaced to provide a slot 12. Each abutment has depending therefrom vertical baffles 13 which serve to prevent flame from the gas burners 14 coming into direct contact with the glass being drawn, but at the same time assuring that the flow chamber will be properly heated for efficient manipulation of the molten glass.

Disposed below the trough 6 is a supplemental chamber 15 which consists of sections 16 and 17, the latter supporting the section 9 of the trough 6, while the former is movable independently of the section 8, the purpose of which will appear later. The sections 16 and 17 are normally spaced, as at 18, the section 17 having pivotally associated therewith a closure 19 adapted to normally close the space between the sections so that heat from the burners 20, which project into the chamber 15 will be retained to heat the same and the bottom of the trough 6. The sections 16 and 17 are both provided with wheels 21 adapted to roll on the rails 22 so that said sections can be moved when desired, it being of course understood that when the section 17 is moved that the section 9 of the trough will be correspondingly moved. In order to move the section 17 an angle lever 23 is employed, the same being pivotally supported in any suitable manner.

Mounted on top of the chamber 10 is a housing 24, communication with the chamber 10 being had through a slot 25 formed in the top of said chamber, said housing having a slot 26 in the top thereof for the passage of the sheet 27, which is projected therethrough by the elevating mechanism 28.

The elevating mechanism comprises a pair of parallel arranged shafts 29 which are journaled in the sides of the housing and each shaft has secured thereto sprockets 30. Around each set of sprockets are trained the sprocket chains 31 connected by closely related transverse slats 32, preferably of wood, and may be covered with asbestos, said chains being also trained around the rollers 32' which are rotatably mounted on shafts 33:

The shafts 33 have their ends supported by hangers 34, the upper ends of which overlap and are pivotally supported in any suitable manner by the side walls of the housing 24, and at points below the shafts 29. Thus it will be seen that these rollers are suspended in such manner as to swing toward each other, and consequently imparts sufficient friction to the slats 32 to cause the same to grip the sheet 27 to cause the same to be moved upwardly through the slot 26, after which the sheets are transferred to the annealing chamber for final treatment. Disposed transversely of the housing 10 is a guide strip 33' which the glass passes when being lifted by the elevating mechanism 28, and serves to guide a hand cutting tool so that the glass can be separated in sheets of predetermined length as it leaves the housing 24.

Disposed below the supplemental chamber 15 are frames 34' arranged in transversely spaced paths, and suitably supported by said frames are upper and lower rollers 35 and 36, respectively, each roller having associated therewith sprocket 37 which are engaged by a sprocket chain 38 so trained as to drive the rollers simultaneously. The frames 34' are provided with wheels 39 adapted to roll on the rails 40, thereby permitting the frames to move toward or away from each other. Since these frames are movable it is necessary to utilize an idler 41 to retain the chain 38 under proper tension, said idler being supported upon the upper end of the pivotally mounted lever 42, there being a weight 43 flexibly connected with the lever to retain the chain 38 at proper tension. A motor 44 serves to actuate the chain 38 so that the same will cause the chain to travel in the direction of the arrow in Figure 1, thereby imparting simultaneously to the rollers 35 and 36 rotary movement in a direction to feed glass in a workable state in a downward direction, it being of course understood that this movement may be reversed upon simply reversing the motor 44.

The frames 34' have associated therewith levers 45 which can be manipulated to move the frames, and thus the rollers 35 and 36 toward or away from each other as desired.

The upper rollers 35 are adjustable independently of the frames 34 through the medium of the boxes 46 which support the ends of the roll shafts 47.

The rollers 35 are provided with a plurality of spaced peripheral annular ribs 47' which serve to center the wire 48 in the workable glass 49 while the same is passing between the rollers 35 and 36. It will be apparent that these ribs will score the glass as it passes between the rollers, but as the glass passes between the lower rollers 36 these scores will be closed by the pressure of said rollers. When making wire glass the rollers 35 and 36 will be in the position as shown in Figure 4.

Immediately under the rails 40 is a table 50, the upper surface of which is provided with longitudinal corrugations 51 which match the corrugations 52 on the roller 53, said roller being geared to the table 50 as at 54, whereby when the table is moved rotary movement will be imparted to the roller 53 so that glass passing in sheet form downwardly between the rollers 36 will be drawn with the table under the roller 53 to form the sheets with corrugations, such glass being used for numerous purposes. The table 50 is provided with wheels 55 which travel on the rails 56 of the supports 57.

Located in the drawing chamber 10 is a pair of parallel arranged asbestos covered feeding rollers 58 which are capable of lateral adjustment in any approved manner, whereby the same may be adjusted to grip the workable glass passing therethrough before it enters the housing 24.

To produce glass for making window panes and the like a bait (not shown) is dropped between the elevating mechanism 28 and between the rollers 58 and into the trough 6. The bait is then lifted so that the glass will be drawn between the rollers 58 and upwardly between the slats 32 of the elevating mechanism, which are caused to travel in any suitable manner in an upward direction, thus projecting the sheets upwardly through the slot 26, and since the glass has been severed at the guide strip 33' it is readily separated into sheets of predetermined length, and then subjected to an annealing process, as is customary.

It sometimes happens that the glass being drawn from the chamber 10 separates, and a part thereof falls back into the trough 6 which changes the condition of the molten glass in said trough to such an extent that clear window glass can not be produced under such conditions, since the glass in the trough becomes "cordy" or "stringy". In order to utilize this glass, the section 9 is moved outwardly through the medium of the lever 23, thus permitting the glass from the trough to flow downwardly to be acted upon by the rollers 35 or 36, to make either wire glass or corrugated glass, or in fact any type of rough glass. It will be of course understood that as soon as the section 9 is moved outwardly that the closure 19 drops to its open position to permit molten glass to pass through the space between the sections 16 and 17.

The gate 3 will be closed so that glass from the melting chamber 2 can not pass into the flow chamber 5 when it is being drawn for action upon by the rollers 35 and 36.

The rollers 36 are provided with longitudinally arranged blades 59, said blades being adapted to cut the glass as it passes between said rollers, it being of course understood that the cutting action takes place after each roller has made a complete revolution and the blades lie adjacent each other.

What is claimed is:

1. In a glass machine, a flow chamber including a trough for receiving molten glass, a drawing chamber above the flow chamber, a supplemental chamber below the flow chamber, an elevating mechanism mounted above the drawing chamber, said drawing chamber being in communication with the housing to permit sheet glass to be drawn from the drawing chamber for engagement with the elevating mechanism, said trough and supplemental chamber including separable sections for simultaneous movement away from each other to permit glass to flow in a downward direction from the trough and through the supplemental chamber.

2. In a glass machine, a communicating drawing and flow chamber, means for drawing continuous glass sheets upwardly from the flow chamber through the drawing chamber, an elevating mechanism located above the drawing chamber for moving the sheet glass from the drawing chamber, means for separating the flow and supplemental chambers to permit glass to flow downwardly when the drawing operation has ceased, and a plurality of laterally adjustable rollers below the supplemental chamber between which the glass is rolled in its downward movement.

3. In a glass machine, a flow chamber, a housing mounted above said chamber, plate elevating means operatively mounted in said housing comprising, spaced sprocket carrying shafts, rollers suspended by endless sprocket chains from said shafts so as to rotate therewith and to swing toward each other.

4. In a glass machine, a flow chamber including a trough for receiving molten glass, means for drawing the glass upwardly from the trough in sheet form, means operable independently of said first named means for discharging the glass from said trough in a downward direction, and means operating on the glass discharged in a downward direction for shaping the same into sheet formation.

5. The method of manufacturing sheet glass which consists in drawing from the top of a body of molten glass sheets of pure clear glass and rolling the same into smooth flat form for use as transparent panels, in separately removing from the bottom of the body of molten glass the impure or imperfect forms thereof and in rolling the same into sheet form for use as glass panels possessing properties other than complete transparency.

In testimony whereof I affix my signature.

GEORGE A. SHIELDS.